United States Patent [19]
Grabijas

[11] 3,781,093
[45] Dec. 25, 1973

[54] ADJUSTABLE MIRROR STAND

[76] Inventor: Sophie Mary Grabijas, 14037 Crosley, Detroit, Mich. 48239

[22] Filed: Oct. 18, 1971

[21] Appl. No.: 190,096

[52] U.S. Cl................. 350/288, 248/481, 248/484
[51] Int. Cl. ............................................. G02b 5/08
[58] Field of Search.................. 248/481, 482, 483, 248/484; 350/288, 304, 305, 307

[56] References Cited
UNITED STATES PATENTS

| 357,749 | 2/1887 | Yale | 287/89 |
|---|---|---|---|
| 3,291,435 | 11/1966 | Herr | 350/288 |
| 3,392,950 | 7/1968 | Pierce | 248/481 |
| 887,283 | 1/1908 | Barrath | 350/288 |
| 2,732,764 | 1/1956 | Parks | 248/481 |

FOREIGN PATENTS OR APPLICATIONS

| 26,058 | 11/1906 | Great Britain | 248/481 |

Primary Examiner—David Schonberg
Assistant Examiner—Michael J. Tokar
Attorney—Russel C. Wells

[57] ABSTRACT

An adjustable mirror stand assembly such as may be used to assist in the application of make-up, has a pair of spaced apart pivoting units to allow substantially one hundred eighty degree spherical positioning at any angular relationship to a supporting surface. An adjustable length shaft further provides height variations of the mirror above the supporting surface.

3 Claims, 4 Drawing Figures

PATENTED DEC 25 1973
3,781,093
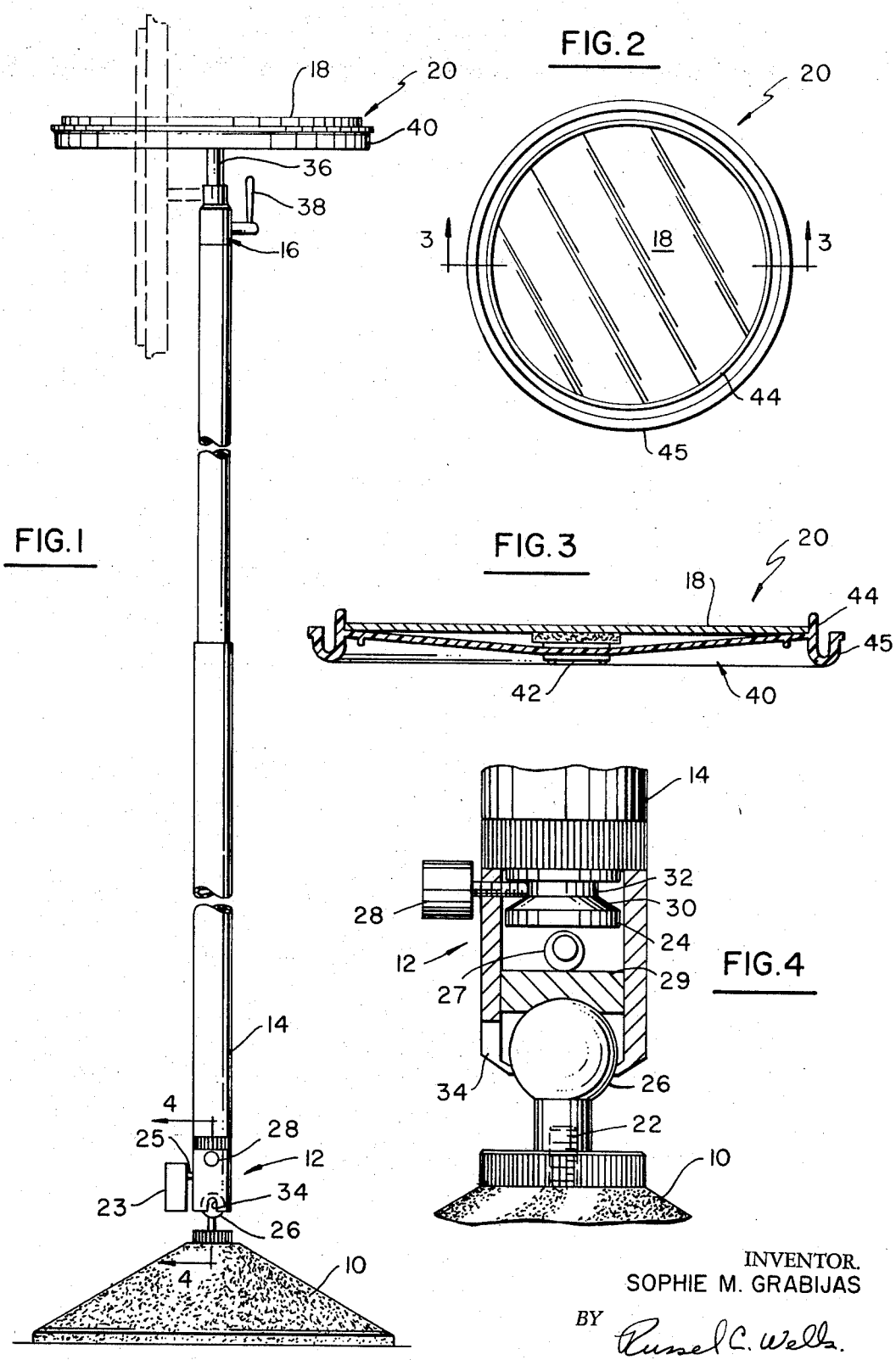
INVENTOR.
SOPHIE M. GRABIJAS
BY Russel C. Wells
ATTORNEY

ADJUSTABLE MIRROR STAND

BACKGROUND OF INVENTION

1. Field of Invention

This relates to mirror supporting structures in general and to pivotal make-up mirrors in particular.

2. Prior Art

Prior art devices have utilized a pair of ball joint members spaced apart between a mounting bracket and an object such as a telephone handset or an antiglare shield held by a shaft. In each of these prior art devices, the one end of the device must be fixedly mounted on a supporting surface. All of the mating surfaces are frictionally held together and therefore when adjusting the object, the operator is pulling or pushing against the frictional holding forces of the shaft or adjusting member.

In some prior art make-up mirror devices, the operator must place her head between two mirrors, one of which is fixed on a base and the second is pivotable on a long curved arm. The purpose of the two mirrors is to provide a composite view, to the operator, however when the head is inserted between the mirrors, the reflection from the one mirror cannot reach the other mirror. In such an instance, the cooperative between the adjustable and the fixed mirror is lost.

In the automotive field, the positioning angle being substantially along a flat plane, such as a plane vertical to the wheelbase of the vehicle, the requirement of infinite adjustment is lost. Hence, the several movable mating surfaces are only frictionally held. Again, all of the bases are fixedly mounted and also resilient protection for the mirror is not taught, shown or considered.

It is a principal object of this invention to provide a portable make-up mirror that is infinitely adjustable in any attitude.

It is another object of this invention to provide releaseable positioning means for positioning the mirror in any attitude.

It is still another object of this invention to provide a shock absorbing cushion to protect the mirror from any external shocks or forces capable of breaking the mirror.

SUMMARY OF INVENTION

An adjustable mirror stand apparatus having a base member with a threaded post centrally located therein and extending away from said base. Threadably attached to the post is a first pivot member comprising a ball pivot member that is adapted to be rotated in a horizontal plane and inclined in a vertical plane. Secured to the ball pivot member by a threaded post extending therefrom, is a telescoping shaft that is adapted to be secured at any vertical position. At the top end of the shaft is a second pivot means also comprising a ball pivoting member having a post extending away therefrom and secured in a mirrored surface unit having an encircling resilient bumper to protect the mirror from any external forces.

DESCRIPTION OF THE DRAWINGS

In the drawings:

FIG. 1 is a plan view of the adjustable mirror stand assembly;

FIG. 2 is a top view of the mirrored surface;

FIG. 3 is a sectional view of the mirrored surface taken along line 3—3 in FIG. 2; and FIG. 4 is a sectional view along line 4—4 of FIG. 1 of the first pivot means.

DETAILED DESCRIPTION

Referring to the FIGS. by the characters of reference there is illustrated in FIG. 1 an adjustable mirror stand assembly comprising a base 10, a first pivot 12, a shaft 14, a second pivot 16 and a mirrored surface 18. As will hereinafter be shown, the mirror assembly 20 is capable of being positioned in substantially any position within a cone described by the shaft 14 about the first pivot 12 having its vertex on the base 10.

The base 10 in the preferred embodiment is a portion of a sphere with a substantial cordal dimension. Extending from the center of the base and away from the surface is a threaded post 22 which is fixed in the base in a permanent manner. The substantial cordal dimension of the base and the weight of the base provide the stabilitly necessary for the mirror assembly 20 in order to provide support allowing the mirrored surface 18 to be placed anywhere within the cone having its apex at the post.

Threaded to the post 22 is the first pivot 12 which is capable of pivotal movement covering any radius in a hemisphere above the base 10. As illustrated in FIG. 4, the pivot 12 is comprised of two sections wherein a first section having a cam 24 permitting horizontal rotation and a second section having a ball pivot 26 permitting angular positioning in a vertical plane. Rotation in the horizontal plane is achieved upon loosening a screw 28 in the side of the pivot 12. The end of the screw 26 is guided in the endless vee-groove 30 of the cam 24 and when the desired horizontal angular position is reached, the screw is tightened against the bottom of the vee-groove 32.

The first pivot 12 in addition to its horizontal rotation has a ball pivot 26 assembly which in cooperation with a U-slot 34 provides angular rotation in the vertical plane. The cooperation between the two sections of the first pivot 12 permits the shaft 14 to be positioned at any angular position within a hemispherical plane. In order to lock the pivot 12 in any vertical position a handle 23 is turned a quarter of turn from a horizontal position to a vertical position. The handle 23 is connected by a shaft 25 to an elliptical cylindrical cam 27 which cooperates with a shoe 29 to lock the pivot on the ball 26. When the handle 23 is horizontal, the shoe 29 is loose and not in contact with the ball 26 then the pivot may be positioned in any vertical position.

Attached to the first pivot 12 and extending away from the base is a standard or a shaft 14. In the preferred embodiment, the shaft 14 is a telescoping shaft which has an extension length equal to approximately three times its collapsed length. By means of a telescoping shaft, the adjustable mirror stand assembly can be adjusted in height for any purpose and compactly closed for ease of transporting the stand. Another type of shaft which may be used is a shaft assembly whereby the shaft is extended by pulling the telescoping shafts apart to the desired length. When the tensional force is removed from the shaft, the compressional force due to the weight of the shaft functions to lock the shaft in position. The shaft is lowered to any position including the closed position by means of a foot releasable brake attached to the bottom of the shaft near the base.

Secured at the upper end of the shaft 14 is a second pivot 16 is a ball pivot. A threaded post 36 is attached to the ball which is positionable at any angle within a hemispherical plane. The ball pivot is contained within the housing which is secured to the upper end of the shaft 14. The ball pivot is locked into place by a quarter-turn of a handle 38 which is connected to an elliptical shaft similar to that of the first pivot 12. In one position, the shaft is not in interference with a shoe member surrounding the bottom of the ball thereby allowing the ball to be positioned at any location. Once the ball is positioned, the handle is turned ninety degrees bringing the major axis of the ellipse into an interference fit with the shoe which in turn is frictionally held tightly against the ball. As in the first pivot, a U-slot, not shown, permits the threaded post to be positioned anywhere within a horizontal plane.

Threadably secured to the threaded post of the second pivot 16 is a mirrored surface assembly 20 comprising a mirror 18, a circumferential bumper member 40 and a threaded connector 42. In the preferred embodiment, the mirror 18 is circular in shape although if desired any geometrical shape may be employed. The mirror 18 is pressed into the resilient bumper member 40 which functions both to retain the mirror, and provide a cushioning means to protect the mirror 18 from external shocks or forces which might cause mirror breakage.

The resilient bumper 40 is basically a plastic member having two circular spaced apart rims 44 and 45 encircling the mirror 18. The inner rim 44 functions to hold the mirror 18 under radial pressure due to the elasticity of the plastic material. The inside free diameter of the inner rim 44 is smaller than the diameter of the mirror 18, hence when the mirror is placed within the rim, the material must be stretched.

The outer rim 45 functions as a cushion or bumper to absorb any external shocks or forces from reaching the mirror. Thus, should the unit fall, the shock of the unit striking the ground or some other surface would be absorbed by the outer rim 45 and not by the mirror 18.

The backside of the circular web of the bumper member and along the vertical axis thereof is a threaded connector 42. This connector is fixedly attached to the back side of the resilient bumper unit 40 and provides means to secure the mirror unit 20 to the upper end of the shaft 14 and in particular to the threaded post 36 of the second pivot 16.

Operation

The mirror 18 by the cooperation of the two pivot members 12 and 16 can be positioned at any compound angle formed by the relationship of the two pivot members. The shaft 14 can be positioned to coincide with any radius of the hemisphere having its diametrical plane parallel to the base of the stand. The mirror can then be positioned tangent to any radius of a hemisphere having its diametrical plane tangent to the end of the shaft.

By means of the telescoping shaft 14, the height of the mirror 18 can be regulated to any desired height. When the mirror stand assembly must be transported, both of the pivot units can be positioned in their U-slots so that the base and the mirror lie in the same plane. This plane is substantially parallel to the shaft.

The mass of the base permits the mirror to be pivoted about the first pivot to a substantial angle with respect to a normal extending through the base. This affords the adjustable mirror stand considerable placement within any attitude from the base plane.

There has thus been shown and described an adjustable mirror stand apparatus having a base member with a threaded post centrally located therein and extending away from said base. Threadably attached to the post is a first pivot member comprising a ball pivot member that is adapted to be rotated in a horizontal plane and inclined in a vertical plane. Secured to the ball pivot member by a threaded post extending therefrom, is a telescoping shaft that is adapted to be secured at any vertical position. At the top end of the shaft is a second pivot means also comprising a ball pivoting member having a post extending away therefrom and secured in a mirrored surface unit having an encircling resilient bumper to protect the mirror from any external forces.

What is claimed is:

1. An adjustable mirror stand unit comprising:
   a base member of substantial mass and having a shape of a portion of a shpere with a post extending away therefrom along an axis normal to the horizontal plane of said base;
   a first cylindrical shaped pivoting unit having a vertical angular positioning section and an axially in line horizontal rotating section, said angular positioning section having a stationary ball pivot secured to said post on said base for pivoting said unit through an angle of one hundred eighty degrees about said axis normal to said base and said horizontal rotating section havina a cam means for rotating said pivoting unit about its axis;
   a telescoping staright shaft means adapted to be secured at one end to said horizontal rotating section of said first pivoting unit for rotation therewith and having threaded means at the other end of said shaft;
   a second cylindrical shaped pivoting unit adapted to be threadably secured to said shaft at one end and having a ball pivoting member extending from the other end, said pivoting unit having means adapted for rotating through a circular plane of movement parallel to said shaft means; and
   a mirror attached to said ball pivoting member of said second pivoting unit, said mirror positionable in a hemispherical arc having its center at said first pivoting unit and rotatable about said second pivoting unit.

2. An adjustable mirror stand mirror stand unit according to claim 1 wherein said mirror has dual spaced apart rim resilient bumper means surrounding said mirror, the inner rim containing said mirror and the outer rim deforming for absorbing any external forces within the plane of said mirror.

3. An adjustable mirror stand unit according to claim 2 wherein said mirror is circular in shape and is retained in said dual spaced apart rim resilient bumper means by means of the elastic forces due to said inner rim diameter being stretched to encircle said mirror.

* * * * *